United States Patent
Lee et al.

(10) Patent No.: US 11,698,621 B2
(45) Date of Patent: Jul. 11, 2023

(54) METHOD, NON-TRANSITORY COMPUTER-READABLE RECORDING MEDIUM, AND DEVICE FOR DETERMINING VARIABLE SETPOINTS OF A PLANT PROTECTION SYSTEM

(71) Applicant: KEPCO ENGINEERING & CONSTRUCTION COMPANY, INC., Gyeongsangbuk-do (KR)

(72) Inventors: Chang Jae Lee, Daejeon (KR); Jae Hee Yun, Daejeon (KR)

(73) Assignee: KEPCO ENGINEERING & CONSTRUCTION COMPANY, INC., Gyeongsangbuk-do (KR)

( * ) Notice: Subject to any disclaimer, the term of this patent is extended or adjusted under 35 U.S.C. 154(b) by 122 days.

(21) Appl. No.: 17/317,012

(22) Filed: May 11, 2021

(65) Prior Publication Data

US 2021/0356933 A1 Nov. 18, 2021

(30) Foreign Application Priority Data

May 12, 2020 (KR) .......................... 10-2020-0056664

(51) Int. Cl.
*G05B 19/4063* (2006.01)
*G06F 1/28* (2006.01)

(52) U.S. Cl.
CPC .......... *G05B 19/4063* (2013.01); *G06F 1/28* (2013.01); *G05B 2219/36545* (2013.01)

(58) Field of Classification Search
CPC .............................. G05B 19/4063; G06F 1/28
See application file for complete search history.

(56) References Cited

U.S. PATENT DOCUMENTS

2016/0133064 A1\* 5/2016 Patino ..................... G07C 5/02
701/29.1

FOREIGN PATENT DOCUMENTS

CN 104974798 B \* 2/2019

OTHER PUBLICATIONS

Lee et al, Variable Setpoint Determination Methodology for the Plant Protection System, 2017, Transactions of the Korean Nuclear Society Autumn Meeting (Year: 2017).\*
Chang Jae Lee et al., "Spurious Trip Reduction Methodology for the Plant Protection System Using a Variable Trip Approach", Korean Nuclear Society Spring Meeting, May 17-18, 2018 (2 pages).
Korean Office Action (Application No. 10-2020-0056664), dated Jan. 17, 2022, (pp. 15).

\* cited by examiner

*Primary Examiner* — Mark A Connolly
(74) *Attorney, Agent, or Firm* — Nixon Peabody LLP; Jeffrey L. Costellia

(57) ABSTRACT

A method of determining variable trip setpoints at the time of performing a safety analysis on a plant protection system includes: selecting a fixed analysis setpoint including a first analysis setpoint at which safety functions are initiated according to process variables of a power plant, and a first reaching time representing a time required to reach the first analysis setpoint; deriving a variable analysis setpoint satisfying conditions of the first fixed analysis setpoint; and determining a variable trip setpoint by reflecting uncertainty of an instrumentation and control system in relation to the variable analysis setpoint.

19 Claims, 10 Drawing Sheets

METHOD, NON-TRANSITORY COMPUTER-READABLE RECORDING MEDIUM, AND DEVICE FOR DETERMINING VARIABLE SETPOINTS OF A PLANT PROTECTION SYSTEM

CROSS-REFERENCE TO RELATED APPLICATION

This application is based on and claims priority under 35 U.S.C. § 119 to Korean Patent Application No. 10-2020-0056664, filed on May 12, 2020, in the Korean Intellectual Property Office, the disclosure of which is incorporated by reference herein in its entirety.

BACKGROUND

1. Field

One or more embodiments relate to a method, computer program, and device for determining variable setpoints of a plant protection system, and more particularly, to a method of determining variable trip setpoints from fixed analysis setpoints of a plant protection system.

2. Description of the Related Art

A nuclear power plant may include systems with over 100 individual functions. For example, a nuclear power plant may include a primary system for a nuclear reactor, a steam generator, a turbine, a secondary system including a generator and a condenser, an engineered safety features system to mitigate consequences of possible accidents, a transmission and distribution system, an instrumentation and control system, and other auxiliary systems.

When a malfunction occurs in the aforementioned systems of the nuclear power plant, a plant protection system may detect the malfunction and initiate a reactor trip function. As such, the plant protection system is considered to be a significant safety system which performs safety functions in the event of occurrence of design basis events in a nuclear power plant, and various setpoints for initiating such safety functions may be determined. When a design basis event occurs and process variables such as pressure, water level, flow, temperature, etc. reach a setpoint, the plant protection system may perform a safety function of generating signals to shut down the nuclear reactor or to actuate engineered safety features.

SUMMARY

One or more embodiments include a systematic and valid method of determining set points to derive variable trip set points from fixed analysis set points while maintaining fixed analysis set points assumed at the time of a safety analysis of a protection system.

One or more embodiments include a method, computer program, and device for determining variable trip setpoints of a plant protection system, which may enhance the safety and economic efficiency of a power plant by reducing the possibility of unnecessary nuclear reactor trips caused by process noise.

Additional aspects will be set forth in part in the description which follows and, in part, will be apparent from the description, or may be learned by practice of the presented embodiments of the disclosure.

According to one or more embodiments, a method of determining variable trip setpoints at the time of performing a safety analysis on a plant protection system includes: selecting a first fixed analysis setpoint including a first analysis setpoint at which safety functions are initiated according to process variables of a power plant, and a first reaching time representing a time required to reach the first analysis setpoint; deriving a variable analysis setpoint satisfying conditions of the first fixed analysis setpoint; and determining a variable trip setpoint by reflecting uncertainty of an instrumentation and control system in relation to the variable analysis setpoint.

The deriving of the variable analysis setpoint may include deriving a second fixed analysis setpoint from the first fixed analysis setpoint by reducing a response time margin of the instrumentation and control system; and deriving a third fixed analysis setpoint from the second fixed analysis setpoint through conversion of unit, and the deriving of the variable analysis setpoint may also include deriving a variable analysis setpoint from the third fixed analysis setpoint.

The first fixed analysis setpoint and the second fixed analysis setpoint may have a percentage flow unit in relation to a reactor coolant system, and the third fixed analysis setpoint may have a percentage differential pressure unit of a steam generator, and further, the variable analysis setpoint may have a differential pressure unit of the steam generator.

The variable analysis setpoint may include a floor analysis setpoint Fa, a step analysis setpoint Sa, and a rate analysis setpoint Ra, and the floor analysis setpoint Fa, the step analysis setpoint Sa and the rate analysis setpoint Ra satisfy conditions of the first fixed analysis setpoint.

The floor analysis setpoint Fa may be determined by multiplying a reference differential pressure of the steam generator and the analysis setpoint, and the reference differential pressure may be determined within a differential pressure range in which the steam generator is in normal operation.

The reference differential pressure may vary within a differential pressure fluctuation range distributed based on a median value, and the step analysis setpoint Sa may be determined within a range greater than the differential pressure fluctuation range, and smaller than a difference between the reference differential pressure and the floor analysis setpoint Fa.

The rate analysis setpoint Ra may be determined by dividing a difference between the reference differential pressure subtracted by the step analysis setpoint Sa and the floor analysis setpoint Fa by the first reaching time.

The determination of the step analysis setpoint Sa may include determination of a trip margin, and the trip margin may be determined to be a difference between a minimum value of the reference differential pressure and a maximum value of the floor analysis setpoint Fa.

In the determination of variable trip setpoints, the variable trip setpoints may include a floor trip setpoint and a step trip setpoint having a differential pressure unit of the steam generator, and the instrumentation and control system may include a transmitter, a signal processor, and the plant protection system. Each of the floor trip setpoint and the step trip setpoint may be determined by adding uncertainties of the transmitter, the signal processor and the plant protection system.

The floor trip setpoint may be determined by adding uncertainties regarding the floor analysis setpoint, of each of the transmitter, the signal processor, and the plant protection system to the trip margin, and the step trip setpoint may be determined by adding uncertainties regarding the step analysis setpoint, of the transmitter, the signal processor, and the plant protection system to the trip margin.

The variable trip setpoint may further include the rate trip setpoint having a differential pressure unit of the steam generator, and the rate trip setpoint may be determined to be identical to the rate analysis setpoint.

According to one or more embodiments, a computer program is stored in a medium to execute any one of the aforementioned methods by using a computer.

According to one or more embodiments, a device for determining variable trip setpoints at the time of performing a safety analysis on a plant protection system includes a controller configured to operate to select a first fixed analysis setpoint including a first analysis setpoint at which safety features are initiated according to process variables of a power plant and a first reaching time representing a time required to reach the first analysis setpoint; to derive a variable analysis setpoint satisfying conditions of the first fixed analysis setpoint; and to determine a variable trip setpoint by reflecting uncertainty of an instrumentation and control system in relation to the variable analysis setpoint.

The controller may operate to derive a second fixed analysis setpoint from the first fixed analysis setpoint by reducing a response time margin of the instrumentation and control system, to derive a third fixed analysis setpoint from the second fixed analysis setpoint through conversion of unit, and to derive a variable analysis setpoint from the third fixed analysis setpoint.

The variable analysis setpoint may include a floor analysis setpoint Fa, a step analysis setpoint Sa, and a rate analysis setpoint Ra, and the floor analysis setpoint Fa, the step analysis setpoint Sa and the rate analysis setpoint Ra satisfy conditions of the first fixed analysis setpoint.

The floor analysis setpoint Fa may be determined by multiplying a reference differential pressure of a steam generator and the analysis setpoint, and the reference differential pressure may be determined within a differential pressure range in which the steam generator is in normal operation.

The reference differential pressure may vary within a differential pressure fluctuation range distributed based on a median value, and the step analysis setpoint Sa may be determined within a range greater than the differential pressure fluctuation range, and smaller than a difference between the reference differential pressure and the floor analysis setpoint Fa.

The rate analysis setpoint Ra may be determined by dividing a difference between the reference differential pressure subtracted by the step analysis setpoint Sa and the floor analysis setpoint Fa by the first reaching time.

The variable trip setpoint may include a floor trip setpoint and a step trip setpoint having a differential pressure unit of the steam generator, and the instrumentation and control system may include a transmitter, a signal processor and a the plant protection system. Each of the floor trip setpoint and the step trip setpoint may be determined by adding uncertainties of the transmitter, the signal processor and the plant protection system.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
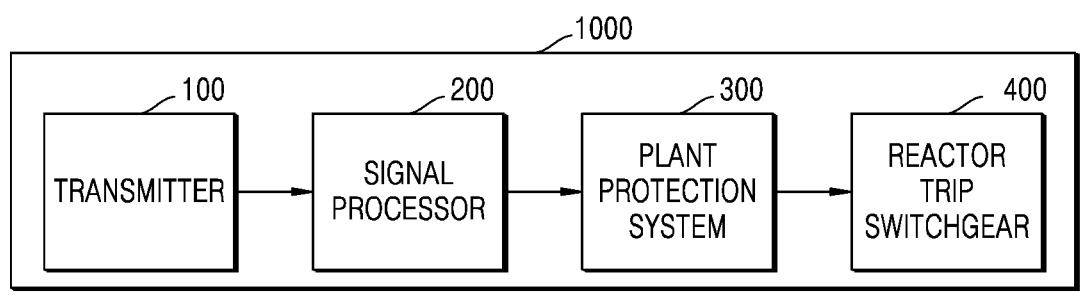
FIG. 1 is a diagram illustrating an example of a channel configuration of an instrumentation and control system according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

As embodiments allow for various changes and numerous embodiments, exemplary embodiments will be illustrated in the drawings and described in detail in the written description. The effects, features of the present disclosure and methods for achieving the same may be clarified by referring to the following detailed embodiments along with the drawings. The present disclosure may, however, be embodied in many different forms and should not be construed as limited to the exemplary embodiments set forth herein.

Hereinafter, embodiments of the present disclosure are explained in detail referring to the attached drawings. When referring to the drawings, like reference numerals may denote like or corresponding elements, and repeated descriptions thereof are omitted.

It will be understood that although the terms "first," "second," etc. may be used herein to describe various components, these components should not be limited by these terms. These components are only used to distinguish one component from another. As used herein, the singular forms "a," "an" and "the" are intended to include the plural forms as well, unless the context clearly indicates otherwise. It will be further understood that the terms "comprises" and/or "comprising" used herein specify the presence of stated features or components, but do not preclude the presence or addition of one or more other features or components. Sizes of components in the drawings may be exaggerated for convenience of explanation. In other words, since sizes and shapes of components in the drawings are arbitrarily illustrated for convenience of explanation, the present disclosure is not limited thereto.

FIG. 1 is a diagram illustrating an example of a channel configuration of an instrumentation and control system according to an embodiment. A method of determining variable trip setpoints of a plant protection system according to an embodiment may be applied to a control process of a plant protection system 300 in an instrumentation and control system 1000 which performs a function of reactor trip in Korean standard nuclear power plants, optimized power reactor (OPR) 1000 power plants, advanced power reactor (APR) 1400 power plants, and any other power plants in Korea as well as to various power plant design processes.

With reference to FIG. 1, the instrumentation and control system 1000 for the reactor trip function may consist of a transmitter 100, a signal processor 200, a plant protection system 300, and a reactor trip switchgear 400.

The plant protection system 300 is a significant safety system which performs safety functions in the event of occurrence of design basis events in a power plant, and various setpoints for initiating such safety functions may be determined. When a design basis event occurs, and process variables such as pressure, water level, flow, temperature, etc. reach a setpoint, i.e., malfunctions are detected from several systems of a power plant, the plant protection system may perform a safety function of generating signals to shut down the nuclear reactor or to actuate engineered safety features. The setpoints of the plant protection system may be determined conservatively from analysis setpoints used in a safety analysis in consideration of a total uncertainty of an instrumentation and control system. In particular, uncertainties of the transmitter 100, the signal processor 200, and the plant protection system 300 may be taken into account, which will be further described in detail in the relevant drawings.

Here, the setpoints may be fixed or variable. In the case of fixed analysis setpoints such as pressure of a pressurizer, pressure of a steam generator, water level of the steam generator, and reactor building pressure variables, plant protection system trip setpoints may also be determined to be fixed while the plant protection system trip setpoints may be determined to be variable for variable analysis setpoints, such as changeable overpower variables. Generally, in ascending process variables, changeable overpower variables have been utilized as a variable to determine variable trip setpoints from variable analysis setpoints. As such, traditionally trip setpoints have been mainly determined to have the same attribute with analysis setpoints (either fixed or variable).

Meanwhile, as for reactor coolant low flow variables, a possibility of increased unnecessary reactor trips may rise due to significant process noise caused by fluctuation of process variables measured during normal operation. Fixed setpoints may remain constant regardless of changes in process signals, and thus, are highly likely to be subject to the aforementioned possibility, whereas variable setpoints may reduce the possibility of unnecessary reactor trips through automatic follow-up control of process variables within a range which ensures safety in consideration of changes in process.

Conventionally, as one way to reduce such possibility, fixed analysis setpoints have been replaced with variable analysis setpoints, followed by deriving of variable trip setpoints in that regard. However, as a change in attributes (fixed or variable) of analysis setpoints may cause an alternation of computational codes which are computation programs for analysis used in safety analysis, it is required to reperform a modeling process regarding a power plant. This, therefore, may lead to various issues including development, verification, licensing, etc. of computational codes for analysis.

Accordingly, the present disclosure aims to prevent unnecessary trips in power plant operations and therefore to enhance safety and economic efficiency of a power plant by providing a novel method of deriving variable trip setpoints from fixed analysis setpoints without changing attributes of analysis setpoints.

Hereinafter, a method of determining variable trip setpoints of the plant protection system 300 according to an embodiment is explained with reference to FIGS. 2 to 4.

Figure 2:
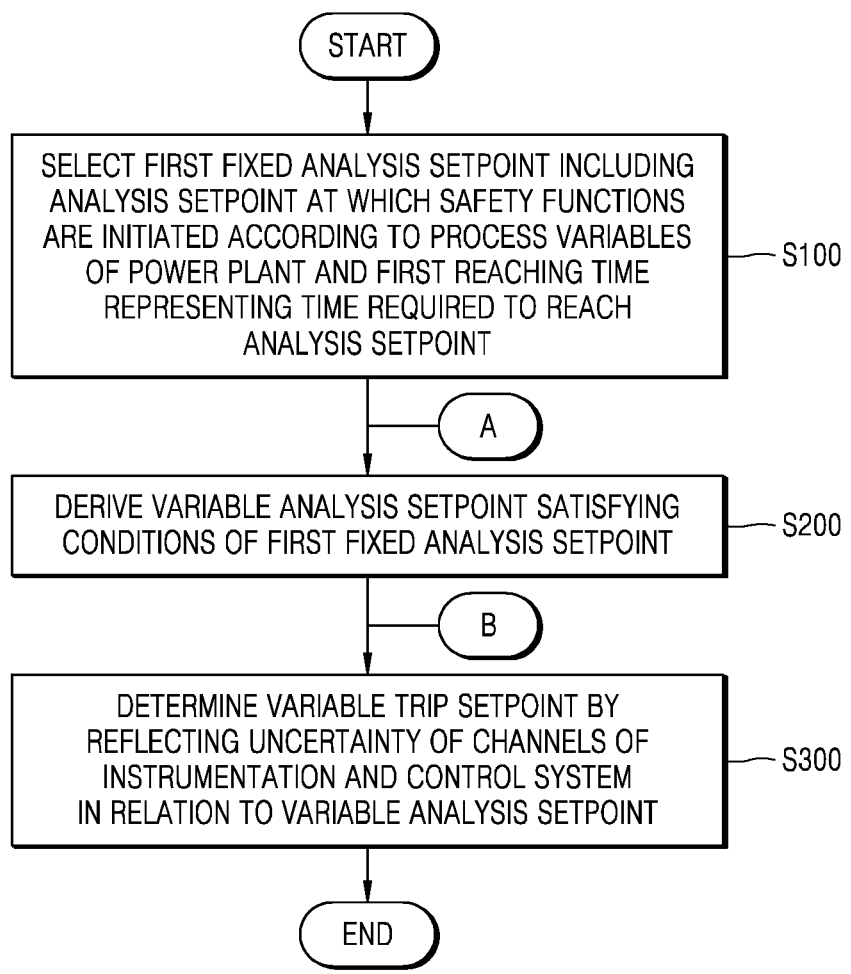
FIG. 2 is a flowchart of a method of determining variable trip setpoints of a plant protection system according to an embodiment.
Figure 3:
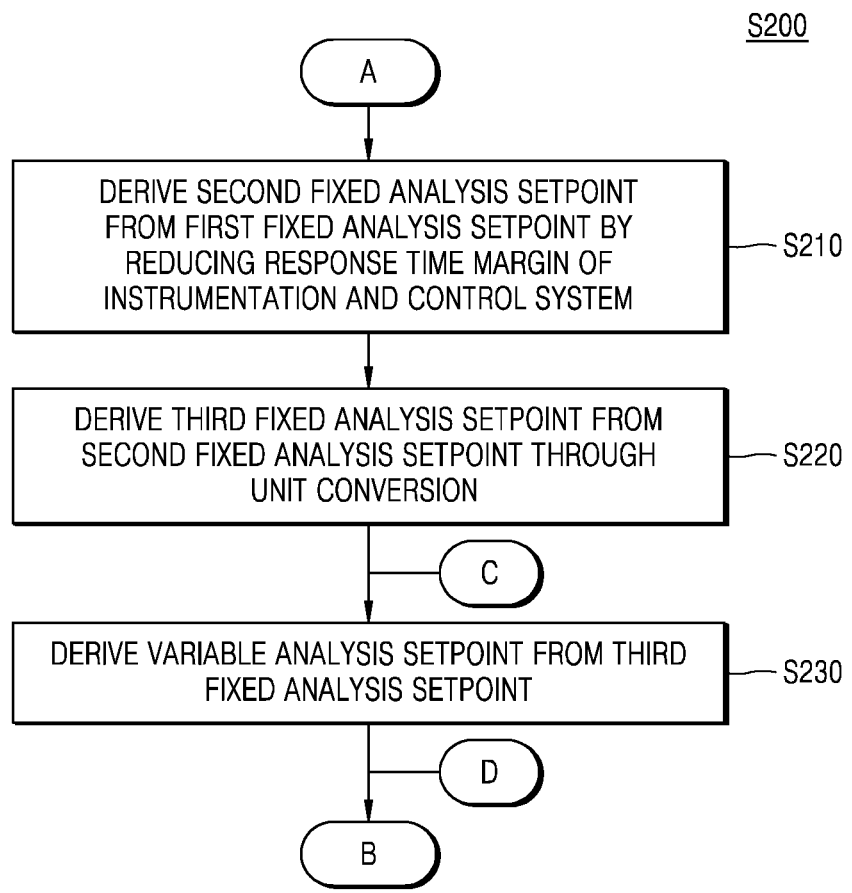
FIG. 3 is a flowchart of a method of determining variable trip setpoints of a plant protection system according to an embodiment.

FIG. 2 is a flowchart illustrating a method of determining variable trip setpoints of a plant protection system according to an embodiment, and FIG. 3 is a flowchart further illustrating in detail a part of operations illustrated in FIG. 2. FIG. 4 is a flowchart illustrating setpoints derived in order according to a method of determining variable trip setpoints of a plant protection system according to an embodiment.

Figure 4:
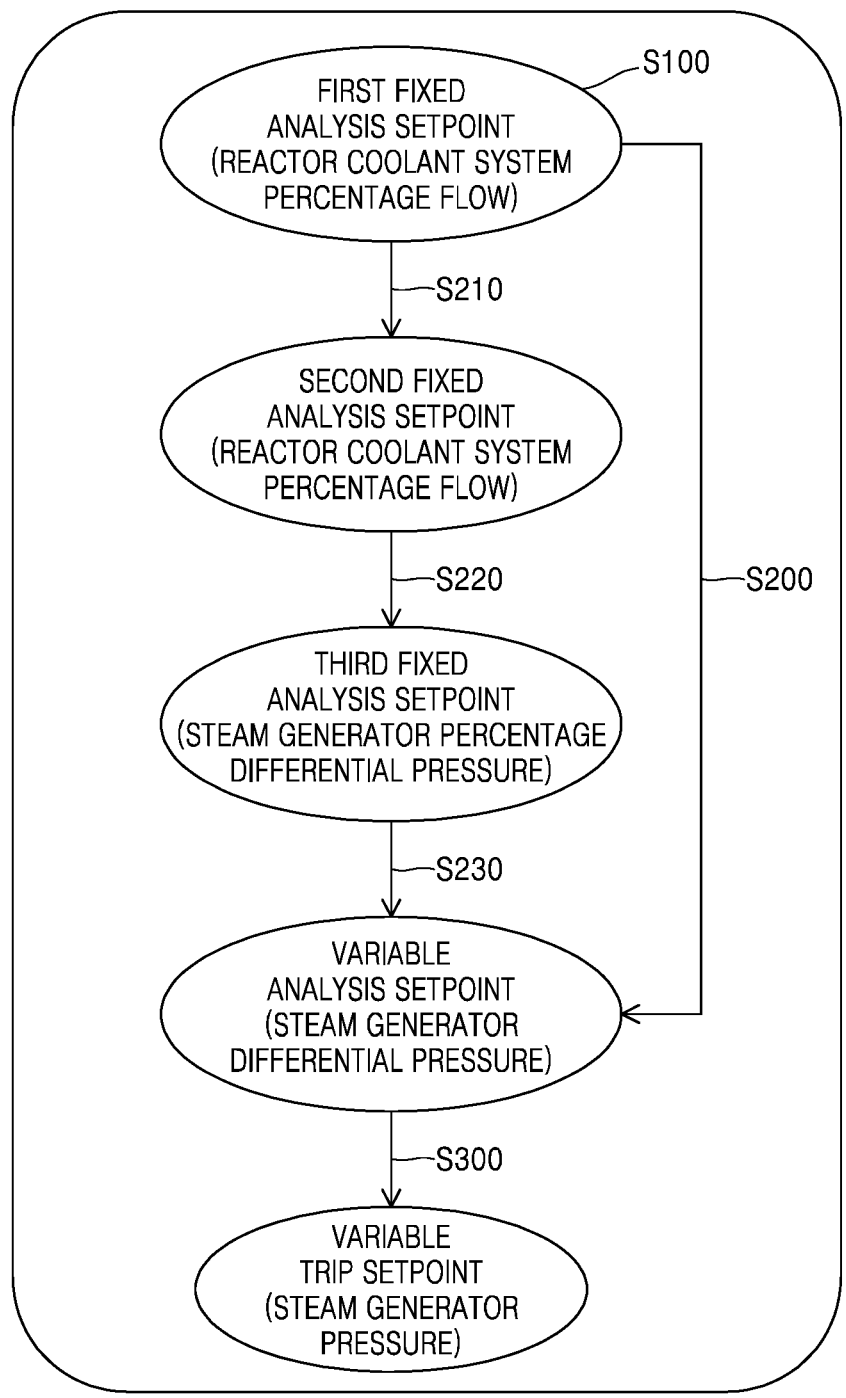
FIG. 4 is a diagram illustrating setpoints derived via a method of determining variable trip setpoints of a plant protection system according to an embodiment.

With reference to FIGS. 2 and 4, a method of determining variable trip setpoints when performing a safety analysis on the plant protection system 300 according to an embodiment includes the following operations.

A first fixed analysis setpoint including an analysis setpoint at which safety functions are initiated according to process variables of a power plant, and a first reaching time representing a time required to reach the analysis setpoint is selected (S100). The first fixed analysis setpoint may have a percentage flow unit in relation to a reactor coolant system. Operation S100 will be further explained in detail with reference to FIG. 6 below.

A variable analysis setpoint satisfying conditions of the first fixed analysis setpoint is derived (S200). In other words, the variable analysis setpoint may satisfy conditions of both variables, i.e., the first analysis setpoint and the first reaching time. Here, with reference to FIGS. 3 and 4, the operation of deriving variable analysis setpoint (S200) may include operations described below.

First, a second fixed analysis setpoint may be derived from the first fixed analysis setpoint by reducing a response time margin of the instrumentation and control system (S210). A second analysis setpoint used to derive the second fixed analysis setpoint may be reduced to be less than the first analysis setpoint used to derive the second fixed analysis setpoint. Then, a third fixed analysis setpoint may be derived from the second fixed analysis setpoint through conversion of unit (S220). Afterward, a variable analysis setpoint may be derived from the third fixed analysis setpoint (S230). Operation S200 will be further explained in detail with reference to FIGS. 7 to 9 below.

In this regard, the second fixed analysis setpoint may have a percentage flow unit in relation to a reactor coolant system, and the third analysis setpoint may have a percentage differential pressure unit of a steam generator. The variable analysis setpoint may have a differential pressure unit of the steam generator.

Referring back to FIGS. 2 and 4, a variable trip setpoint is determined by reflecting uncertainty of the instrumentation and control system 1000 in relation to the variable analysis setpoint (S300).

Figure 5:
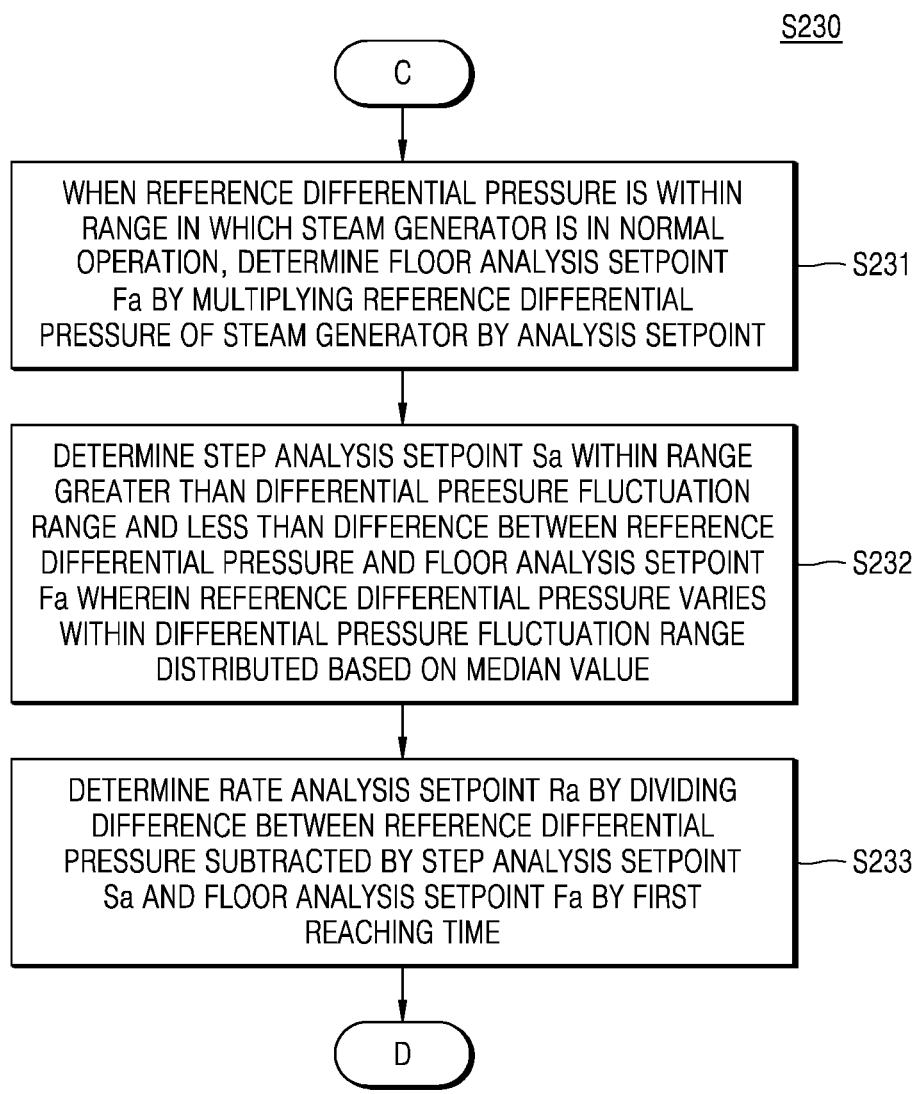
FIG. 5 is a flowchart of a method of determining variable trip setpoints of a plant protection system according to an embodiment.

FIG. 5 is a flowchart illustrating a method of determining variable trip setpoints of a plant protection system according an embodiment, and further explains operation S230 in detail.

In operation S230 to derive a variable analysis setpoint from the third fixed analysis setpoint, the variable analysis setpoint may include three variables of a floor analysis setpoint Fa, a step analysis setpoint Sa and a rate analysis setpoint Ra. The floor analysis setpoint Fa, step analysis setpoint Sa, and rate analysis setpoint Ra may satisfy conditions of the first fixed analysis setpoint.

First, the floor analysis setpoint Fa may be determined by multiplying a reference differential pressure of a steam generator of a power plant and an analysis setpoint (S231). The reference differential pressure may be determined within a range in which the steam generator is in normal operation, and may vary within a differential pressure fluctuation range distributed based on a median value.

The step analysis setpoint Sa may be determined within a range greater than the differential pressure fluctuation range, and smaller than a difference between the reference differential pressure and the floor analysis setpoint Fa (S232). The determination of the step analysis setpoint Sa may include determination of a trip margin tm.

The rate analysis setpoint Ra may be determined by dividing a difference between the reference differential pressure subtracted by the step analysis setpoint Sa and the floor analysis setpoint Fa by the first reaching time (S233).

Figure 6:
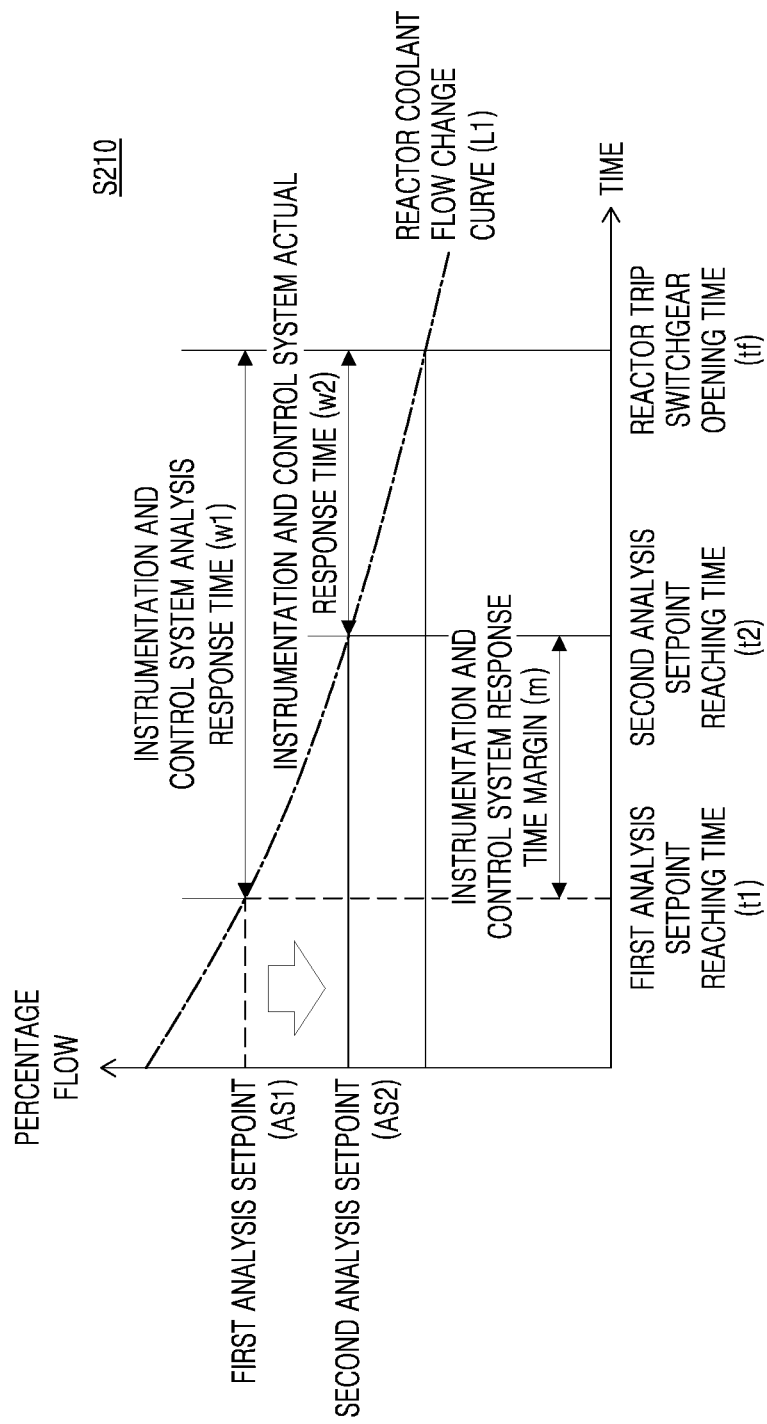
FIG. 6 is a graph illustrating deriving of a second fixed analysis setpoint according to an embodiment.

Hereinafter, operations S100 and S210 are further explained in detail with reference to FIG. 6. FIG. 6 is a graph illustrating deriving of a second fixed analysis setpoint according to an embodiment.

With reference to FIG. 6, a reactor coolant flow change curve L1 (hereinafter, "flow change curve") representing changes in reactor coolant system percentage flow over time (hereinafter, "percentage flow") is illustrated. When performing a safety analysis on the plant protection system 300, an analysis setpoint AS and a reaching time representing a time required to reach the analysis setpoint may be selected (S100). At this time, initial values thereof are referred to as a first analysis setpoint AS1 and a first reaching time t1, respectively. 'A first fixed analysis setpoint' may be a concept encompassing both variables of the first analysis setpoint AS1 and the first reaching time t1. When a design basis event occurs, safety functions may be initiated at the point of time t1 when the aforementioned process variables reach the first analysis setpoint AS1. Then, it may be assumed that opening of a reactor trip switchgear, which is a safety function, is completed at an opening time tf of the reactor trip switchgear, which is a point of time when an instrumentation and control system analysis response time w1 (hereinafter, "analysis response time") has passed from the first reaching time t1.

Accordingly, trip setpoints set to the plant protection system 300 may be determined conservatively in consideration of uncertainty of the instrumentation and control system 1000 to ensure analysis setpoints. Further, an instrumentation and control system actual response time w2 (hereinafter, "actual response time") should be determined to be smaller than an analysis response time w1, thereby securing an instrumentation and control system response time margin between the analysis response time w1 and the actual response time w2 (m=w1−w2).

Here, a second analysis setpoint AS2 may be derived from the first analysis setpoint AS1 by reducing the response time margin m of the instrumentation and control system. At this time, a second fixed analysis setpoint may be a concept encompassing the second analysis setpoint AS2 and a second reaching time t2 representing a time required to reach the second analysis setpoint AS2. As such, when reducing analysis setpoints, margins applied to variable setpoints described below may be increased by raising trip margins of fixed analysis setpoints.

Figure 7:
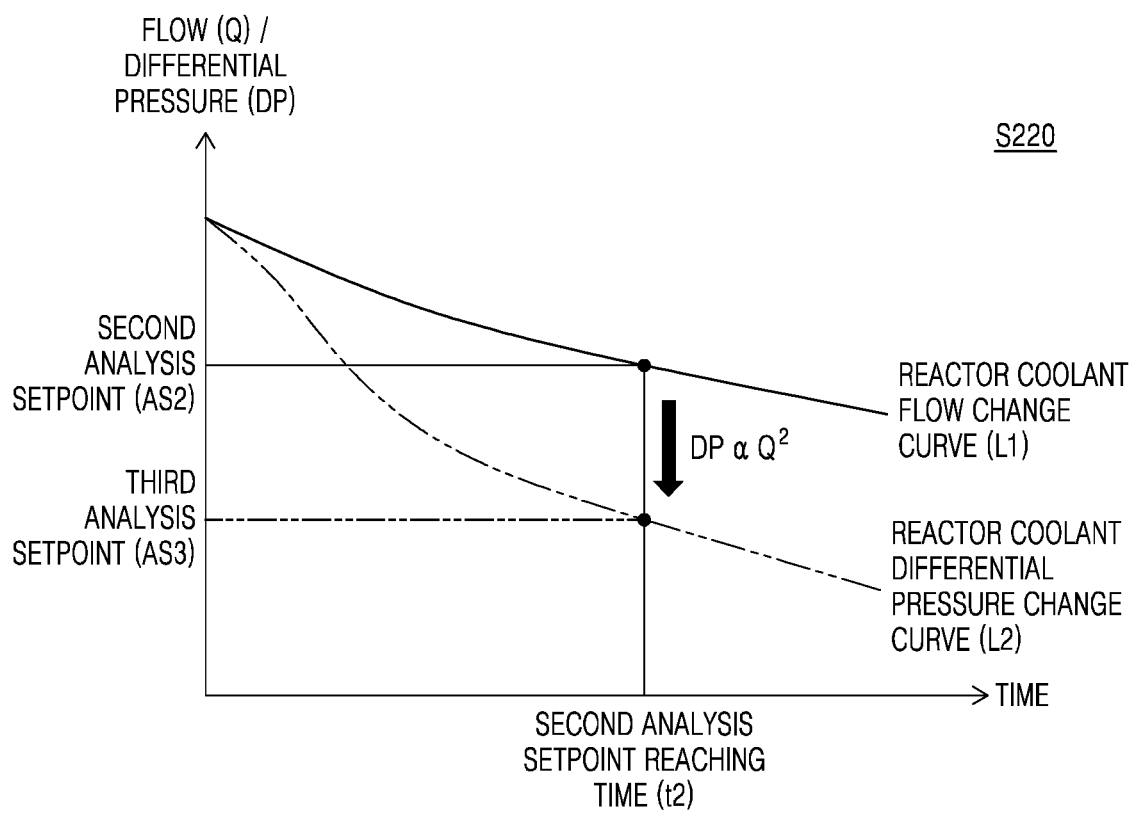
FIG. 7 is a graph illustrating deriving of a third fixed analysis setpoint according to an embodiment.

FIG. 7 is a graph illustrating the operation of deriving a third fixed analysis setpoint according to an embodiment, and further explains in detail operation S210 to derive the third fixed analysis setpoint from the second fixed analysis setpoint.

The aforementioned flow change curve L1 representing changes in percentage flow Q/percentage differential pressure DP over time, and a reactor coolant differential pressure change curve L2 (hereinafter, "differential pressure change curve") are illustrated in FIG. 7. The relation between the two curves L1 and L2 may be determined by the following [Equation 1].

$$Q = K\sqrt{\frac{DP}{\rho}} \quad \text{[Equation 1]}$$

(Q: percentage flow, K: proportional constant, DP: percentage differential pressure, ρ: density)

That is, the percentage differential pressure DP is proportional to a square of the percentage flow Q as indicated in the following [Equation 2].

$$DP \propto Q^2 \quad \text{[Equation 2]}$$

Accordingly, the differential pressure change curve L2 may be derived from the flow change curve L1, and the third analysis setpoint AS3 may be derived from the second analysis setpoint AS2 under the same second reaching time t2. A third fixed analysis setpoint may be a concept encompassing a third analysis setpoint AS3 and a third reaching time t3 representing a time required to reach the third analysis setpoint AS3, and the third reaching time t3 may be identical to the second reaching time t2. According to the aforementioned [Equation 2], the third analysis setpoint AS3 may have a value less than the second analysis setpoint AS2.

Figure 8:
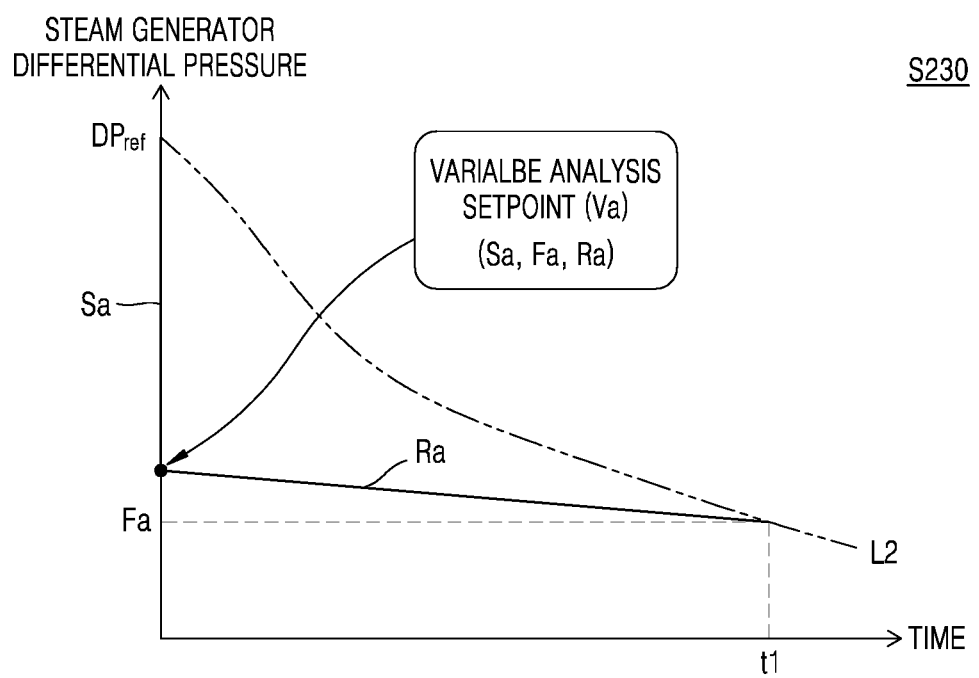
FIGS. 8 and 9 are graphs illustrating deriving of variable analysis setpoints from fixed analysis setpoints according to an embodiment.
Figure 9:
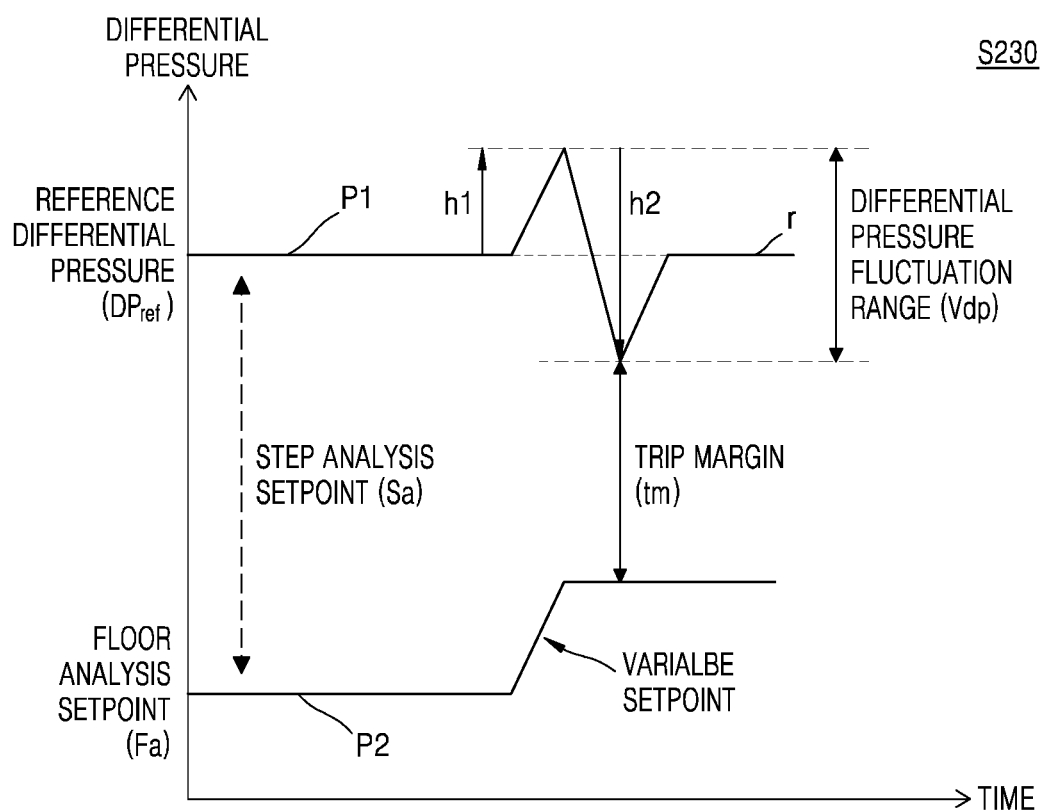

FIGS. 8 and 9 are graphs illustrating deriving of variable analysis setpoints from fixed analysis setpoints according to an embodiment. In particular, FIGS. 8 and 9 further explain operation S230 in which a variable analysis setpoint having a differential pressure unit is derived from a third fixed analysis setpoint having a percentage differential pressure unit.

FIG. 8 illustrates the aforementioned differential pressure change curve L2 representing changes in steam generator differential pressure over time (hereinafter, "differential pressure").

As illustrated in FIG. 8, the variable analysis setpoints Va may include three variables of a floor analysis setpoint Fa, a step analysis setpoint Sa, and a rate analysis setpoint Ra. The "variable trip setpoints" described below may be determined in consideration of a total uncertainty of the instrumentation and control system and a trip margin in relation to the variable analysis setpoints Va. However, as for reactor coolant low flow variables, "fixed analysis setpoints" are used for a safety analysis and thus, it is required that the fixed analysis setpoints are converted into "variable analysis setpoints Va" first to determine "variable trip setpoints."

The floor analysis setpoint Fa, the step analysis setpoint Sa and the rate analysis setpoint Ra may be determined to satisfy two variables of an initial fixed analysis setpoint, i.e., the first fixed analysis setpoint, which are the first analysis setpoint AS and the first reaching time t1.

First, a method for determining the floor analysis setpoint Fa is explained below. The floor analysis setpoint Fa may be determined by multiplying a reference differential pressure DPr and a first analysis setpoint AS1 as indicated in the following [Equation 3].

$$Fa = DPr \times AS1 \qquad \text{[Equation 3]}$$

A floor analysis setpoint Fa having a differential pressure unit may be derived by multiplying a first analysis setpoint AS having a percentage differential pressure unit and a reference differential pressure DPr. At this time, the reference differential pressure DPr may be determined within a range in which a power plant is in normal operation, and the lower the value is, the more advantageous it is to secure a variation range. The floor analysis setpoint Fa may indicate a minimum value to which a differential pressure of the steam generator may drop. The first reaching time t1 may be determined at a point where an extended line of the floor analysis setpoint Fa and the differential pressure change curve L2 meet.

Next, with reference to FIG. 9, a method of determining a step analysis setpoint Sa is explained below. FIG. 9 illustrates a first profile P1 representing changes in the floor analysis setpoint Fa over time and a second profile P2 representing changes in the reference differential pressure DPr. With reference to the first profile P1, the reference differential pressure DPr may have a differential pressure fluctuation range Vdp based on a median value r. There may be a rise range h1 and a fall range h2 based on the median value r. At this time, the rise range h1 has no limit whereas the fall range h2 may be limited to secure a trip margin tm with the floor analysis setpoint Fa. The trip margin tm may represent a difference between a minimum value of the reference differential pressure DPr and a maximum value of the floor analysis setpoint Fa. The second profile P2 may vary proportionally according to values calculated by multiplying the first analysis setpoint AS1 by the rise range h1 and the fall range h2 of the reference differential pressure DPr according to the foregoing [Equation 3] and thus, may present an aspect of change as in P2 of FIG. 9.

The step analysis setpoint Sa may be determined to be smaller than a difference between the reference differential pressure DPr and the floor analysis setpoint Fa. At this time, when the fluctuation range Vdp of the differential pressure DP signals exceed the step analysis setpoint Sa during normal operation, a channel trip may occur under normal operating conditions. A trip may refer to an operation of generating trip signals at a threshold value at the time of occurrence of a design basis event. For example, in the case of descending conditions, process variables decrease until they reach a threshold value at which point a trip occurs to initiate safety functions.

Accordingly, the step analysis setpoint Sa may be determined in a range greater than the differential pressure fluctuation range Vdp, and smaller than a difference between the reference differential pressure DPr and the floor analysis setpoint Fa as indicated in the following [Equation 4].

$$Vdp < Sa < (DPr - Fa) \qquad \text{[Equation 4]}$$

Referring back to FIG. 8, a method of determining the rate analysis setpoint Ra is explained below. The rate analysis setpoint Ra may be determined by dividing a difference between the reference differential pressure DPr subtracted by the step analysis setpoint Sa (DPr−Sa) and the floor analysis setpoint Fa (DPr−Sa−Fa) by the first reaching time t1 as indicated in the following [Equation 5].

$$Ra = \frac{DPr - Sa - Fa}{t1} \qquad \text{[Equation 5]}$$

When [Equation 3] is applied into the foregoing [Equation 5] eliminating the variables, the relation among three variables of the variable analysis setpoint Va may be described as indicated in the following [Equation 6].

$$Ra = \frac{(1 - AS)}{AS \times t1} \cdot Fa - \frac{1}{t1} \cdot Sa \qquad \text{[Equation 6]}$$

As such, the variable setpoint Va may be determined by the aforementioned floor analysis setpoint Fa, step analysis setpoint Sa and rate analysis setpoint Ra.

Referring back to FIG. 2, a method of determining a variable trip setpoint Vt having a differential pressure unit from the variable analysis setpoint Va having a differential pressure unit (S300) is further explained in detail below.

The variable trip setpoint Vt may be determined in consideration of a total uncertainty of channels of the instrumentation and control system 1000 (see FIG. 1) regarding the variable analysis setpoint Va (S300). The variable trip setpoint Vt may include a floor trip setpoint Ft, a step trip setpoint St, and a rate trip setpoint Rt. Each of the floor trip setpoint Pt and the step trip setpoint St may be determined by reflecting uncertainties regarding each of the floor analysis setpoint Pa and the step analysis setpoint Sa, of a transmitter 100, a signal processor 200, and a plant protection system 300 as well as a trip margin tm.

More specifically, the floor trip setpoint Ft may be determined by adding a total uncertainty of the transmitter 100, the signal processor 200, and the plant protection system 300 and the trip margin tm to the floor analysis setpoint Fa. The foregoing "total uncertainty" may be a concept encompassing a random uncertainty (U; Ut, Us, Up) which has random and independent attributes and a bias uncertainty (B; Bt, Bs, Bp) which has bias attributes. The random uncertainty U may refer to an uncertainty having both positive and negative values, and the bias uncertainty B to an uncertainty having either positive or negative value.

More specifically, with reference to the following [Equation 7], the random uncertainty U is combined by applying square-root-sum-of-squares (SRSS), and the bias uncertainty B is aggregated through an arithmetical adding method. In other words, a random uncertainty Ut of the transmitter 100, a random uncertainty Us of the signal processor 200 and a random uncertainty Up of the plant protection system 300 may be added up by applying SRSS, and a bias uncertainty Bt of the transmitter 100, a bias uncertainty Bs of the signal processor 200, and a bias uncertainty Bp of the plant protection system 300 may be arithmetically aggregated.

$$Ft = Fa + (\sqrt{Ut^2 + Us^2 + Up^2} + Bt + Bs + Bp + tm) \qquad \text{[Equation 7]}$$

Similarly, the step trip setpoint St may be determined by adding a total uncertainty of the transmitter 100, the signal processor 200, and the plant protection system 300, and a trip margin tm to the step analysis setpoint Sa. The same principle used to derive the floor trip setpoint Ft may be applied to deriving of the step trip setpoint St as indicated in the following [Equation 8] and thus, repeated descriptions thereof are omitted.

$$St = Sa + (\sqrt{Ut^2 + Us^2 + Up^2} + Bt + Bs + Bp + tm) \qquad \text{[Equation 8]}$$

The rate trip setpoint Rt may be determined by changes in differential pressure DP signals provided to the plant protection system 300 unlike the aforementioned floor trip setpoint Pt and the step trip setpoint St and thus, an uncertainty of the differential pressure DP signals may be equally reflected to the rate analysis setpoint Ra. Accordingly, the rate trip setpoint Rt may be determined to be identical to the rate analysis setpoint Ra as indicated in the following [Equation 9].

$$Rt=Ra \qquad \text{[Equation 9]}$$

As such, according to an embodiment of the present disclosure, by deriving a variable trip setpoint set to a plant protection system from a fixed analysis setpoint of a reactor coolant low flow variable to satisfy safety analysis requirements, safety of a power plant is guaranteed and economic efficiency may also be enhanced by reducing a possibility of unnecessary reactor trips.

Figure 10:
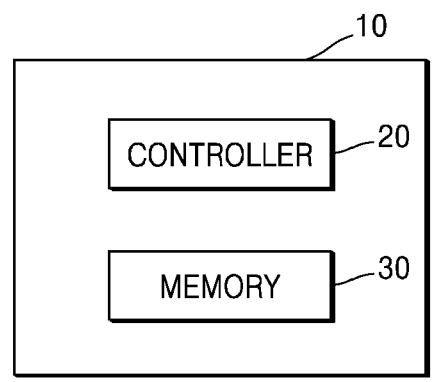
FIG. 10 is a diagram briefly illustrating a device configured to determine variable setpoints of a plant protection system according to an embodiment.

FIG. 10 is a diagram briefly illustrating a device for determining variable setpoints of a plant protection system (hereinafter, "variable setpoint determination device") according to an embodiment. Hereinafter, repeated description of the aforementioned embodiments may be simplified or omitted, and with reference to FIGS. 1 to 9, like reference numerals are used to denote like components and variables in the following descriptions.

The variable setpoint determination device 10 may include a controller 20 and a memory 30. The controller 20 may perform operations based on the method of determining variable setpoints of a plant protection system according to the aforementioned embodiments.

The controller 20 may include all kinds of devices capable of data processing, such as a processor. Here, the "processor" may refer to a data processing device which is embedded in hardware and has a physically structured circuit to perform functions represented as commands or codes included in a program. The processor may include a processing device such as a microprocessor, a central processing unit (CPU), a processor core, a multiprocessor, an application-specific integrated circuit (ASIC), a field programmable gate array (FPGA), etc; however, it is not limited thereto.

The controller 20 may operate to select a first fixed analysis setpoint including a first analysis setpoint AS1 at which safety functions are initiated according to process variables of a power plant, and a first reaching time t1 representing time to reach the first analysis setpoint AS1, to derive a variable analysis setpoint Va satisfying conditions of the first fixed analysis setpoint, and to determine a variable trip setpoint Vt by reflecting uncertainty of an instrumentation and control system in relation to the variable analysis setpoint Va.

In the determination of the variable analysis setpoint Va, the controller 20 may derive a second fixed analysis setpoint from the first fixed analysis setpoint AS1 and t1 by reducing a response time margin m of the instrumentation and control system. Then, a third fixed analysis setpoint may be derived from the second fixed analysis setpoint through conversion of unit. Thereafter, the controller 20 may operate to derive a variable analysis setpoint from the third fixed analysis setpoint.

The variable analysis setpoint may include a floor analysis setpoint Fa, a step analysis setpoint Sa, and a rate analysis setpoint Ra, and the three variables Fa, Sa and Ra may be determined to satisfy conditions of the first fixed analysis setpoint AS1 and t1.

The floor analysis setpoint Fa may be determined by multiplying a reference differential pressure of a steam generator and the analysis setpoint. The reference differential pressure DPr may be determined within a range in which the steam generator is in normal operation, and vary within a differential pressure fluctuation range distributed based on a median value r.

The step analysis setpoint Sa may be determined with a range greater than the differential pressure fluctuation range, and smaller than a difference between the reference differential pressure and the floor analysis setpoint Fa.

The rate analysis setpoint Ra may be determined by dividing a difference between the reference differential pressure subtracted by the step analysis setpoint Sa, and the floor analysis setpoint Fa by the first reaching time.

The variable trip setpoint Vt may include a floor trip setpoint Ft having a differential pressure unit of a steam generator and a step trip setpoint St having a differential pressure unit of a steam generator, and each of the floor trip setpoint Ft and the step trip setpoint St may be determined by adding uncertainties of a transmitter 100, a signal processor 200 and a plant protection system 300.

The memory 30, a recording medium readable by a processor of the controller 20, may include a permanent mass storage device such as a random access memory (RAM), a read only memory (ROM), a disk drive, etc.; however, the scope of the present disclosure is not limited thereto.

In the memory 30, data which the variable setpoint determination device 10 requires to perform determination methods according to various embodiments of the present disclosure, and which are generated during performance of the methods are permanently or temporarily stored. For example, the aforementioned equations, variables included in setpoints and/or their relation data may be stored in the memory 30.

The variable setpoint determination device 10 is an external device separate from the plant protection system 300, and variables of the variable trip setpoints Ft, St and Rt may be derived according to operations of the a controller 120, and then input into a controller (not explicitly shown in the drawings) of the plant protection system 300. Thereafter, the controller (not explicitly shown in the drawings) in the power plant protection system 300 may receive the variables Ft, St and Rt, and input signals regarding reactor coolant flow, and then generate a variable trip setpoint Vt based on the received variables Ft, St, and Rt and the flow input signals to implement a logic for flow trip.

Meanwhile, depending on embodiments, the operation of the controller 120 of the variable setpoint determination device 10 (i.e., calculation of variables Ft, St and Rt of variable trip setpoints) may be computed manually by a designer instead of a processor.

Depending on embodiments, the variable setpoint determination device 10 may be implemented in the plant protection system 300, and operations of the controller 20 of FIG. 10 may be performed in the plant protection system 300. However, the implementation location of the variable setpoint determination device 10 is not limited thereto, and may be changed variously to the extent that variable trip setpoints Vt inside or outside the instrumentation and control system 1000 may be generated.

Embodiment 1

Hereinafter, it is described as an embodiment an example in which the present disclosure is applied to reactor coolant low flow variables of a domestic advanced power reactor (APR)1400 power plant.

The most limited design basis events applied to reactor coolant low flow variables of an APR1400 power plant are reactor coolant pump shaft break and steam line break. With reference to Table 1 below, an analysis setpoint AS1, an analysis setpoint reaching time t1, and an instrumentation and control system analysis response time w1 for each design basis event are indicated.

First, operations S100 and S210 are explained with reference to [Table 1] and [Table 2].

TABLE 1

| Design basis event | Analysis setpoint AS1 | Analysis setpoint reaching time t1 | Instrumentation and control system analysis response time w1 |
| --- | --- | --- | --- |
| Reactor coolant pump shaft break | 80% Flow | 0.405 secs. | 1.2 secs. |
| Steam line break | 70% Flow | 6.906 secs. | 0.85 secs. |

With reference to [Table 1], in the case of reactor coolant pump shaft break, an analysis setpoint used for safety analysis is 80% of hot leg flow; a reaching time to reach the analysis setpoint of 80% is 0.425 seconds; and an instrumentation and control system analysis response time is 1.2 seconds. In other words, when a reactor coolant pump shaft break occurs, a reactor trip is initiated at the setpoint of 80% of the hot leg flow, and the time to reach 80% Flow is 0.405 seconds. After 1.2 seconds from this, a reactor trip switchgear is opened, which may be interpreted as meeting an acceptable level of safety analysis.

Similarly, in the case of steam line break, an analysis setpoint used for safety analysis is 70% of reactor core flow, and an analysis response time regarding the setpoint of 70% is 0.85 seconds. This means that when a steam line break occurs, a reactor trip is initiated at the setpoint of 70% of the reactor core flow, and the time to reach 70% Flow is 6.906 seconds. After 0.85 seconds from this, a reactor trip switchgear is opened, which may be interpreted as meeting an acceptable level of safety analysis.

In [Table 1], the instrumentation and control system analysis response times w1 are indicated as 1.2 secs. and 0.85 secs., respectively. However, actual response time w2 (i.e., "changed instrumentation and control system analysis response time" in [Table 2] below) may be 0.7 seconds. When the actual response time w2 is 0.7 seconds as mentioned above, an analysis setpoint reaching time may increase, and the resulting changed analysis setpoint reaching time (i.e., the aforementioned second reaching time t2) is indicated in the following [Table 2].

TABLE 2

| Design basis event | Changed analysis setpoint AS2 | Changed analysis setpoint reaching time t2 | Changed instrumentation and control system analysis response time w2 |
| --- | --- | --- | --- |
| Reactor coolant pump shaft break | 56.8% Flow | 0.905 secs. | 0.7 secs. |
| Steam line break | 69.6% Flow | 7.056 secs. | 0.7 secs. |

With reference to [Table 2], in the case of reactor coolant pump shaft break, the analysis setpoint reaching time is 0.905 seconds increased by the instrumentation and control system analysis response time margin m, i.e., 0.5 seconds. Meanwhile, in the case of steam line break, the analysis setpoint reaching time is 7.056 seconds increased by the instrumentation and control system analysis response time margin m, i.e., 0.15 seconds. At this time, analysis setpoints AS2 corresponding to the changed analysis setpoint reaching times t2 may be identified by using data on flow change over time in relation to each event, used at the time of performing the safety analysis (e.g., a flow change curve L1 of FIG. 6), and the analysis setpoints are as indicated in the above [Table 2].

Next, operation S220 is explained with reference to [Table 3].

As pressures at both primary ends of the steam generator are used to measure a reactor coolant flow, analysis setpoints need to be converted into differential pressure unit. According to the foregoing [Equation 2], as the differential pressure DP is proportional to a square of the flow Q, third analysis setpoints AS3 in percentage differential pressure unit may be derived from the second analysis setpoints AS2 in percentage flow unit as indicated in the following [Table 3].

TABLE 3

| Design basis event | Changed analysis setpoint (percentage flow unit) AS2 | Changed analysis setpoint (percentage differential pressure unit) AS3 | Changed analysis setpoint reaching time t2 |
| --- | --- | --- | --- |
| Reactor coolant pump shaft break | 56.8% Flow | 32.3% DP | 0.905 secs. |
| Steam line break | 69.6% Flow | 48.5% DP | 7.056 secs. |

Next, operation S230 is explained with reference to [Table 4].

First, in operation S231 to determine the floor analysis setpoint Fa, a reference differential pressure DPr of both primary ends of the steam generator may be determined within a normal operation range, which may be determined, for example, to be about 1400 $cmH_2O$. According to the aforementioned [Equation 3], the lower a reference differential pressure DPr is, the lower a floor analysis setponint Fa gets and accordingly, a variation range of variable setpoints may be increased.

The floor analysis setpoint Fa values according to the reference differential pressure are indicated in the following [Table 4]. Hereinafter, a further explanation thereon is provided with an example of steam line break occurrence. As the maximum value of a step analysis setpoint Sa is a difference between a reference differential pressure DPr and a floor analysis setpoint Fa, it may be determined as 721 $cmH_2O$, which is obtained by subtracting 679 $cmH_2O$ from 1400 $cmH_2O$. Meanwhile, the minimum value of a step analysis setpoint Sa is a differential pressure fluctuation range VDp according to the aforementioned [Equation 4], and the differential pressure fluctuation range VDp may be determined, for example, to be about 500 $cmH_2O$ according to power plant operation experience. Thus, the step analysis setpoint Sa may have a range equal to or greater than 500 cm $H_2O$, and equal to or less than 721 cm $H_2O$, and in [Table 4] it is assumed as 700 $cmH_2O$. The rate analysis setpoints Ra may be calculated according to the aforementioned [Equation 5], and may be determined as a result of such calculation, to be 2.9 $cmH_2O$/s as indicated in the following [Table 4].

TABLE 4

| Changeable variables | Design basis event | |
|---|---|---|
| | Steam line break | Reactor coolant pump shaft break |
| FLOOR analysis setpoint Fa | 679.0 cm H$_2$O | 452.2 cm H$_2$O |
| STEP analysis setpoint Sa | 700.0 cm H$_2$O | 700.0 cm H$_2$O |
| RATE analysis setpoint Ra | 2.9 cm H$_2$O/s | 273.8 cm H$_2$O/s |

The same principle applied to the foregoing case of steam line break may be applied to a reactor coolant pump shaft break accident as well.

Hereinafter, operation S300 is explained with reference to [Table 5].

From the perspective of an early reactor trip of reactor coolant low flow variables from the two design basis events of the present disclosure, the analysis setpoints regarding the steam line break are considered conservative values and thus, may be determined to be final safety analysis requirements. Any setpoint which may quickly cope with a low flow accident through a fast reactor trip, thereby enhancing safety of a power plant may be considered as a conservative value. In an accident in which a reactor coolant flow is reduced, the greater a floor analysis setpoint Fa value is, from the floor analysis setpoint Fa perspective, and the smaller a rate analysis setpoint Ra value (reduction rate) is, from the rate analysis setpoint Ra perspective, the sooner they reach a descending flow change curve (or a differential pressure change curve resulted therefrom), allowing an early reactor trip.

With reference to [Table 4], as the steam line break event has a greater floor analysis setpoint Fa value and a smaller rate analysis setpoint Ra value, compared to those in a reactor coolant pump shaft break event, the conservativeness is considered to be high from both floor analysis setpoint Fa and rate analysis setpoint Ra perspectives. Hereinafter, a further explanation is provided with an example of determination of variable trip setpoints Vt regarding variables Fa, Sa and Ra of the variable analysis setpoints Va in the steam line break event indicated in [Table 4] above.

According to the aforementioned [Equation 7] and [Equation 8], floor trip setpoints and step trip setpoints may be determined as indicated in the following [Table 5], and rate trip setpoints may be determined to be identical to rate analysis setpoints according to the aforementioned [Equation 9]. The trip setpoints in the following [Table 5] may be the final trip setpoints that are actually applied to an APR1400 power plant.

TABLE 5

| | Design basis event | |
|---|---|---|
| Setpoint variables | Analysis setpoint Va | Trip setpoint Vt |
| FLOOR | 679.0 cm H$_2$O | 726.6 cm H$_2$O |
| STEP | 700.0 cm H$_2$O | 652.4 cm H$_2$O |
| RATE | 2.9 cm H$_2$O/s | 2.9 cm H$_2$O/s |

As such, according to an embodiment of the present disclosure, variable trip setpoints Ft, St and Rt which have a differential pressure unit and are applied to a plant protection system may be derived from fixed analysis setpoints having a percentage flow unit assumed at the time of safety analysis. As the variable trip setpoints are values reflecting process noise of a measured differential pressure in relation to the plant protection system 300, safety and economic efficiency of a power plant may be enhanced by reducing a possibility of unnecessary reactor trips, compared to fixed setpoints.

The aforementioned method of determining variable setpoints according to embodiments of the present disclosure may be implemented in the form of a computer program which can be executed in a computer through various components, and such computer program may be recorded in a computer readable medium. At this time, the medium may store a program executable by a computer. A medium configured to store program commands, such as a magnetic medium including a hard disk, a floppy disk, and a magnetic tape, an optical recording medium including a CD-ROM and a DVD, a magneto-optical medium including a floptical disk, as well as a ROM, RAM and a flash memory may be included in examples of the aforementioned medium.

Meanwhile, the computer program may be specifically designed and configured for the present disclosure, or may be publicized for use to those skilled in the field of computer software. Not only machine language codes generated by a compiler, etc., but high level language codes which can be executed by a computer by using interpreters, etc. are also included in examples of the computer program.

According to embodiments of the present disclosure, variable trip setpoints may be derived from fixed analysis setpoints at the time of safety analysis of a protection system, and accordingly, safety and economic efficiency of a power plant may be enhanced by reducing a possibility of unnecessary reactor trips caused by process noise.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A method of determining variable trip setpoints of a plant protection system, the method comprising:
    selecting a first fixed analysis setpoint including a first analysis setpoint at which safety functions are initiated according to process variables of a power plant, and selecting a first reaching time representing a time required to reach the first analysis setpoint;
    deriving a variable analysis setpoint satisfying conditions of the first fixed analysis setpoint; and
    determining a variable trip setpoint by reflecting uncertainty of an instrumentation and control system in relation to the variable analysis setpoint.

2. The method of claim 1, wherein the deriving of the variable analysis setpoint includes:
    deriving a second fixed analysis setpoint from the first fixed analysis setpoint by reducing a response time margin of the instrumentation and control system; and
    deriving a third fixed analysis setpoint from the second fixed analysis setpoint through a unit conversion;
    wherein the deriving of the variable analysis setpoint further includes deriving a variable analysis setpoint from the third fixed analysis setpoint.

3. The method of claim 2, wherein the first fixed analysis setpoint and the second fixed analysis setpoint each have a percentage flow unit in relation to a reactor coolant system, the third fixed analysis setpoint having a percentage differential pressure unit of a steam generator, and the variable analysis setpoint having a differential pressure unit of the steam generator.

4. The method of claim 2, wherein the variable analysis setpoint includes a floor analysis setpoint Fa, a step analysis setpoint Sa, and a rate analysis setpoint Ra, and the floor analysis setpoint Fa, the step analysis setpoint Sa, and the rate analysis setpoint Ra each satisfy conditions of the first fixed analysis setpoint.

5. The method of claim 4, wherein the floor analysis setpoint Fa is determined by multiplying a reference differential pressure of the steam generator by the analysis setpoint, and the reference differential pressure is determined within a differential pressure range in which the steam generator is in normal operation.

6. The method of claim 5, wherein the reference differential pressure varies within a differential pressure fluctuation range distributed based on a median value, and the step analysis setpoint Sa is determined within a range greater than the differential pressure fluctuation range and less than a difference between the reference differential pressure and the floor analysis setpoint Fa.

7. The method of claim 6, wherein the rate analysis setpoint Ra is determined by dividing a difference between the reference differential pressure subtracted by the step analysis setpoint Sa and the floor analysis setpoint Fa by the first reaching time.

8. The method of claim 6, wherein determining the step analysis setpoint Sa includes determining a trip margin, and the trip margin is determined as a difference between a minimum value of the reference differential pressure and a maximum value of the floor analysis setpoint Fa.

9. The method of claim 8, wherein in determining the variable trip setpoint, the variable trip setpoint including a floor trip setpoint and a step trip setpoint having a differential pressure unit of the steam generator, and the instrumentation and control system includes a transmitter, a signal processor, and the plant protection system, and
wherein each of the floor trip setpoint and the step trip setpoint is determined by adding uncertainties of the transmitter, the signal processor, and the plant protection system.

10. The method of claim 9, wherein the floor trip setpoint is determined by adding uncertainties of the transmitter, the signal processor, and the plant protection system, regarding the floor analysis setpoint, and the trip margin, and the step trip setpoint is determined by adding uncertainties of the transmitter, the signal processor, and the plant protection system, regarding the step analysis setpoint, and the trip margin.

11. The method of claim 8, wherein the variable trip setpoint further includes a rate trip setpoint having a differential pressure unit of the steam generator, and the rate trip setpoint is determined to be identical to the rate analysis setpoint.

12. A non-transitory computer-readable recording medium storing therein an operating program that causes a computer to execute a process comprising:
selecting a first fixed analysis setpoint including a first analysis setpoint at which safety functions are initiated according to process variables of a power plant, and
selecting a first reaching time representing a time required to reach the first analysis setpoint;
deriving a variable analysis setpoint satisfying conditions of the first fixed analysis setpoint; and
determining a variable trip setpoint by reflecting uncertainty of an instrumentation and control system in relation to the variable analysis setpoint.

13. A device for determining variable trip setpoints of a plant protection system, comprising:
a controller configured to operate to:
select a first fixed analysis setpoint including a first analysis setpoint at which safety functions are initiated according to process variables of a power plant, and select a first reaching time representing a time required to reach the first analysis setpoint;
derive a variable analysis setpoint satisfying conditions of the first fixed analysis setpoint; and
determine a variable trip setpoint by reflecting uncertainty of an instrumentation and control system in relation to the variable analysis setpoint.

14. The device of claim 13, wherein the controller is further configured to operate to:
derive a second fixed analysis setpoint from the first fixed analysis setpoint by reducing a response time margin of the instrumentation and control system;
derive a third fixed analysis setpoint from the second fixed analysis setpoint through conversion of unit; and
derive a variable analysis setpoint from the third fixed analysis setpoint.

15. The device of claim 14, wherein the variable analysis setpoint includes a floor analysis setpoint Fa, a step analysis setpoint Sa, and a rate analysis setpoint Ra, and the floor analysis setpoint Fa, the step analysis setpoint Sa, and the rate analysis setpoint Ra each satisfy conditions of the first fixed analysis setpoint.

16. The device of claim 15, wherein the floor analysis setpoint Fa is determined by multiplying a reference differential pressure of a steam generator by the analysis setpoint, and the reference differential pressure is determined within a differential pressure range in which the steam generator is in normal operation.

17. The device of claim 16, wherein the reference differential pressure varies within a differential pressure fluctuation range distributed based on a median value, and the step analysis setpoint Sa is determined within a range greater than the differential pressure fluctuation range and less than a difference between the reference differential pressure and the floor analysis setpoint Fa.

18. The device of claim 17, wherein the rate analysis setpoint Ra is determined by dividing a difference between the reference differential pressure subtracted by the step analysis setpoint Sa and the floor analysis setpoint Fa by the first reaching time.

19. The device of claim 18, wherein the variable trip setpoint includes a floor trip setpoint and a step trip setpoint having a differential pressure unit of the steam generator;
wherein the instrumentation and control system includes a transmitter, a signal processor, and the plant protection system; and
wherein each of the floor trip setpoint and the step trip setpoint is determined by adding uncertainties of the transmitter, the signal processor, and the plant protection system.

* * * * *